(12) United States Patent
Lich et al.

(10) Patent No.: US 9,168,889 B2
(45) Date of Patent: Oct. 27, 2015

(54) METHOD FOR RELEASING A RESTRAINT DEVICE FOR A RIDER ON A VEHICLE AND A CORRESPONDING VEHICLE

(71) Applicants: Thomas Lich, Schwaikheim (DE); Andreas Georgi, Leonberg (DE)

(72) Inventors: Thomas Lich, Schwaikheim (DE); Andreas Georgi, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/383,807

(22) PCT Filed: Jan. 17, 2013

(86) PCT No.: PCT/EP2013/050784
§ 371 (c)(1),
(2) Date: Sep. 8, 2014

(87) PCT Pub. No.: WO2013/131672
PCT Pub. Date: Sep. 12, 2013

(65) Prior Publication Data
US 2015/0091287 A1    Apr. 2, 2015

(30) Foreign Application Priority Data
Mar. 8, 2012   (DE) .......................... 10 2012 203 640

(51) Int. Cl.
*B60R 22/32* (2006.01)
*B62J 27/00* (2006.01)
(Continued)

(52) U.S. Cl.
CPC .............. *B60R 22/322* (2013.01); *B60R 22/24* (2013.01); *B62J 27/00* (2013.01); *B62K 11/04* (2013.01); *B62J 2099/002* (2013.01); *B62K 2207/02* (2013.01); *B62K 2207/04* (2013.01)

(58) Field of Classification Search
CPC . B62J 27/00; B62J 2099/008; B62J 2099/002
USPC ...................................... 280/801.1; 701/1, 45
See application file for complete search history.

(56) References Cited

U.S. PATENT DOCUMENTS 6,031,484 A * 2/2000 Bullinger et al. ................ 342/72
6,908,103 B2 * 6/2005 Umeda et al. .............. 280/730.1
(Continued)

FOREIGN PATENT DOCUMENTS

DE      198 21 134      12/1999
DE      103 17 439      11/2004
(Continued)

OTHER PUBLICATIONS

International Search Report for PCT/EP2013/050784, dated Apr. 11, 2013.

*Primary Examiner* — Ruth Ilan
*Assistant Examiner* — Darlene P Condra
(74) *Attorney, Agent, or Firm* — Kenyon & Kenyon LLP

(57) ABSTRACT

A method for releasing a restraint device for a rider on a vehicle, the restraint device having a connecting element by which the rider is detachably connected to the vehicle, includes: ascertaining an inclination angle and/or a slope angle of the vehicle; ascertaining a rotational rate about a longitudinal axis of the vehicle and/or a transverse axis of the vehicle; comparing each ascertained rotational rate with an associated critical rotational rate which is a function of the inclination angle and/or the slope angle; and releasing the connecting element if the ascertained rotational rate is at least equal to the associated critical rotational rate.

10 Claims, 5 Drawing Sheets

(51) Int. Cl.
*B62K 11/04* (2006.01)
*B60R 22/24* (2006.01)
*B62J 99/00* (2009.01)

(56) References Cited

U.S. PATENT DOCUMENTS

| | | | |
|---|---|---|---|
| 7,516,980 B2 * | 4/2009 | Kobayashi et al. | 280/733 |
| 7,997,613 B2 * | 8/2011 | Kobayashi et al. | 280/735 |
| 8,783,722 B1 * | 7/2014 | Gallo | 280/801.1 |
| 2007/0075533 A1 | 4/2007 | Makabe et al. | |
| 2008/0201042 A1 * | 8/2008 | Cuddihy et al. | 701/45 |
| 2011/0062690 A1 * | 3/2011 | Kizaki | 280/735 |
| 2011/0154561 A1 * | 6/2011 | Singhal | 2/455 |
| 2012/0259479 A1 * | 10/2012 | Yoneta et al. | 701/1 |
| 2014/0200780 A1 * | 7/2014 | Watanabe et al. | 701/68 |
| 2014/0318245 A1 * | 10/2014 | Perego et al. | 73/510 |

FOREIGN PATENT DOCUMENTS

| | | |
|---|---|---|
| EP | 0 985 360 | 3/2000 |
| EP | 348616 A1 | 10/2003 |
| JP | 2000313381 A | 11/2000 |
| JP | 2001030971 A | 2/2001 |
| JP | 2006151280 A | 6/2006 |
| JP | 2009154637 A | 7/2009 |

* cited by examiner

METHOD FOR RELEASING A RESTRAINT DEVICE FOR A RIDER ON A VEHICLE AND A CORRESPONDING VEHICLE

BACKGROUND OF THE INVENTION

1. Field of the Invention

The present invention relates to a method for releasing a restraint device for a rider on a vehicle.

2. Description of the Related Art

The number of motorcycles has risen sharply in the last several years, with approximately 33 million motorized two-wheelers being registered throughout Europe in 2008. At the same time, however, it is apparent that motorcycles are by far the most dangerous means of transportation. Although operators of motorized two-wheelers amount to just two percent of all road users, they constitute approximately 14 percent of the traffic fatalities counted in Europe. Motorcycle riders are exposed to a substantially higher risk in road traffic compared to automobile drivers. Among other things, this is due to the differing driving physics and the constantly unstable state of equilibrium, the particular physical and mental strain when riding a motorcycle, and the rider's restricted field of vision. At the same time, motorcycle riders are significantly more susceptible to weather conditions and other interfering factors such as poor road conditions or unforeseen traffic situations. Since there is no auto body, motorcycle riders are relatively vulnerable road users, despite protective clothing.

Published German patent application document DE 103 17 439 A1 discloses a motorcycle having a restraint device for motorcycles having a connecting element, via which the motorcycle rider is detachably connected to the motorcycle. When a rear-end collision occurs, the motorcycle rider is initially kept on the motorcycle by the connecting element during a first phase of the rear-end collision. The restraining force of the connecting element thus counteracts the inertial force of the motorcycle rider. The connecting element is situated in such a way that in the first phase, the motorcycle rider is moved relative to the motorcycle against the restraining force of the connecting element due to inertia. In the process, kinetic energy of the motorcycle rider is dissipated. The connecting element is then released without the involvement of the motorcycle rider.

BRIEF SUMMARY OF THE INVENTION

Thus, there is a need to provide a method via which a restraint device is released in the event of a fall of the motorcycle rider, with the aid of which the motorcycle rider is securely connected to the motorcycle.

According to a first exemplary embodiment of the present invention, a method is provided for releasing a restraint device for a rider on a vehicle, in particular a two- or three-wheeler. The restraint device has a connecting element. The rider and the vehicle are detachably connected to each other via the connecting element. The method has the following method steps: ascertaining an inclination angle and/or a slope angle of the vehicle, ascertaining respectively one rotational rate about a longitudinal axis of the vehicle and/or about a transverse axis of the vehicle, comparing each ascertained rotational rate with an associated critical rotational rate which is a function of the inclination angle and/or the slope angle, releasing the connecting element if the ascertained rotational rate and the associated critical rotational rate are equal.

The proposed method is based on the observation that a predetermined rotational rate may be applied to the vehicle as a function of an inclination angle, which is also referred to as a lean angle, and/or a slope angle, which is also referred to as a pitch angle, until the vehicle overturns and the rider sitting on the vehicle falls. This rotational rate, which is referred to here as the critical rotational rate, may, for example, be stored in a control unit as a characteristic curve. By ascertaining the inclination angle and/or the slope angle and constantly ascertaining the instantaneous rotational rate and constantly comparing the at least one ascertained rotational rate with the at least one critical rotational rate, it may be determined by the control unit when the rider is no longer able to prevent overturning of the vehicle. The connecting element is released at this instant. The connecting element is thus released before the rider makes ground contact due to a fall. A fall generally occurs either when negotiating curves, in which the vehicle essentially overturns about a longitudinal axis of the vehicle, or during a collision with an obstacle, in which the vehicle essentially overturns about a transverse axis of the vehicle. Whereas when negotiating curves, a roll rate, i.e., a rotational rate or rotational speed about the longitudinal axis of the vehicle, is essentially ascertained, in a collision with an obstacle, a pitch rate, i.e., a rotational speed about the transverse axis of the vehicle, is ascertained. The rotational rates may, for example, be detected by inertial sensors, which may be designed as rotation-rate sensors. Based on the ascertained rotational rates, the associated angles may be calculated as the inclination angle and the slope angle with the aid of appropriate mathematical formulas or algorithms. The vehicle may be designed as a motorcycle or a three-wheeler, the three-wheeler generally being equipped with two vehicle wheels on the front fork. It should be noted that applying a front-wheel brake, in particular in connection with the absence of an ABS (antilock braking system), may cause overturning of the motorcycle and/or the three-wheeler about the transverse axis of the vehicle and subsequent rollover. The method procedures for releasing the restraint device with the aid of the connecting element are the same for a collision with an obstacle and for pitching during full braking; therefore, no distinction is made between these two conditions below. Of course, the conditions of curve negotiation and collision with an obstacle may overlap, so that the instant of the release of the connecting element is also determined for these driving conditions. An overlap of the pitch rate and the roll rate may occur. The separation of the rider from the restraint system occurs before a fall, regardless of whether it was caused by a deliberately performed driving maneuver or a driving error.

According to another exemplary embodiment of the present invention, in additional method steps, a translational speed is ascertained in a longitudinal direction of the vehicle, and a particular translational speed is ascertained in a transverse direction of the vehicle and/or in a vertical direction of the vehicle. The ascertained roll rate is verified by the particular ascertained translational speeds.

By verifying the ascertained roll rate via the particular translational speeds, an additional parameter is consulted for deciding whether the connecting element is to be released. When negotiating curves, the translational speeds in the longitudinal direction of the vehicle and in the transverse direction of the vehicle are thus ascertained via corresponding sensors, in particular, inertial sensors. In the event of a collision with an obstacle, the translational speeds in the longitudinal direction of the vehicle and in the vertical direction of the vehicle are ascertained. Here as well, according to the driving situation, for example, in the event of a collision with an obstacle when negotiating curves, all three speeds in the translational direction may possibly be required for verification.

According to another exemplary embodiment of the present invention, as an additional method step, an emergency signal including a piece of information is transmitted if the ascertained rotational rate and the critical rotational rate are equal, or the ascertained rotational rate is greater than the critical rotational rate.

This emergency signal may, for example, be transmitted to appropriate locations such as the fire department, a police station, or a highway maintenance depot. It is also possible to transmit the emergency signal to other road users in order to make them aware of the emergency situation of the motorcycle or the rider. The emergency signal may also be transmitted to a local reception station located in the vicinity, which may in turn forward it to third parties. The emergency signal is transmitted at an instant at which the motorcycle has not yet overturned or the rider has not yet fallen, but at which overturning or falling appears to be inevitable. Of course, the emergency signal may also be transmitted if the fall has already taken place.

According to another exemplary embodiment of the present invention, the information is selected from a group made up of a vehicle condition before a fall and a location of the fall.

Particularly in connection with a GPS (global positioning system), the location of the fall may be transmitted in the form of GPS coordinates, thus making it easily possible for first responders to find the location of the fall. The vehicle condition before a fall may, for example, be the speed of the vehicle, the direction of the fall, or even a potential collision with other road users.

According to another exemplary embodiment of the present invention, in another method step, at least one warning device which is situated on the vehicle and is perceptible to other road users is switched on if the ascertained rotational rate and the critical rotational rate are equal, or the ascertained rotational rate is greater than the critical rotational rate.

Other road users may thus be warned before the vehicle has to negotiate curves. An indication is thus provided to the road users following the motorcycle and/or approaching the motorcycle that the vehicle in question or the motorcycle rider is likely to fall. The warning device may be designed, for example, as hazard warning lights, as flashing headlights, and/or as a horn.

The advantages described above with respect to the individual features of the provided method are also valid for the following device. Thus, a repetition will be omitted.

According to another exemplary embodiment of the present invention, a vehicle, in particular a two- or three-wheeler having a restraint device for one rider, is provided. The restraint device has a connecting element. The rider and the vehicle are detachably connected to each other by a connecting element. A control unit and a first sensor are connected to each other. The control unit and the connecting element are connected to each other. The first sensor is configured to detect a measured value and to transmit it to the control unit. The control unit is configured to ascertain an inclination angle and/or a slope angle of the vehicle from the measured value. The control unit is configured to ascertain a rotational rate from the measured value. The control unit is configured to compare the ascertained rotational rate with a critical rotational rate which is a function of the inclination angle and/or the slope angle. If the ascertained rotational rate and the critical rotational rate are equal or the ascertained rotational rate is greater than the critical rotational rate, the connecting element is controlled by the control unit in such a way that the connection of the rider to the vehicle is released.

According to another exemplary embodiment of the present invention, the control unit and a second sensor are connected to each other. The second sensor is configured to detect a measured value and to transmit it to the control unit. The control unit ascertains a translational speed in a longitudinal direction of the vehicle and a particular translational speed in a transverse direction of the vehicle and/or in a vertical direction of the vehicle from the measured value. The ascertained rotational rate is verified by the particular ascertained translational speeds with the aid of the control unit.

According to another exemplary embodiment of the present invention, the first sensor and the second sensor are each an inertial sensor.

The inertial sensor may be designed as a rotation-rate sensor.

According to another exemplary embodiment of the present invention, the control unit and a transmitting device are connected to each other, the transmitting device being configured to transmit an emergency signal if the ascertained rotational rate and the critical rotational rate are equal, or the ascertained rotational rate is greater than the critical rotational rate.

According to another exemplary embodiment of the present invention, a warning device is situated on the vehicle which is perceptible to other road users. The warning device and the control unit are connected to each other. The warning device is switched on by the control unit if the ascertained rotational rate and the critical rotational rate are equal, or the ascertained rotational rate is greater than the critical rotational rate.

It is to be noted that ideas concerning the present invention are described herein in connection both with a method for releasing a restraint device and with a vehicle, in particular, a two- or three-wheeled vehicle. It will be obvious to those skilled in the art that the individual features described may be combined with one another in various ways in order to additionally arrive at other embodiments of the present invention.

DETAILED DESCRIPTION OF THE INVENTION

Specific embodiments of the present invention are described below with reference to the attached figures. The figures are merely schematic and are not true to scale.

Figure 1:
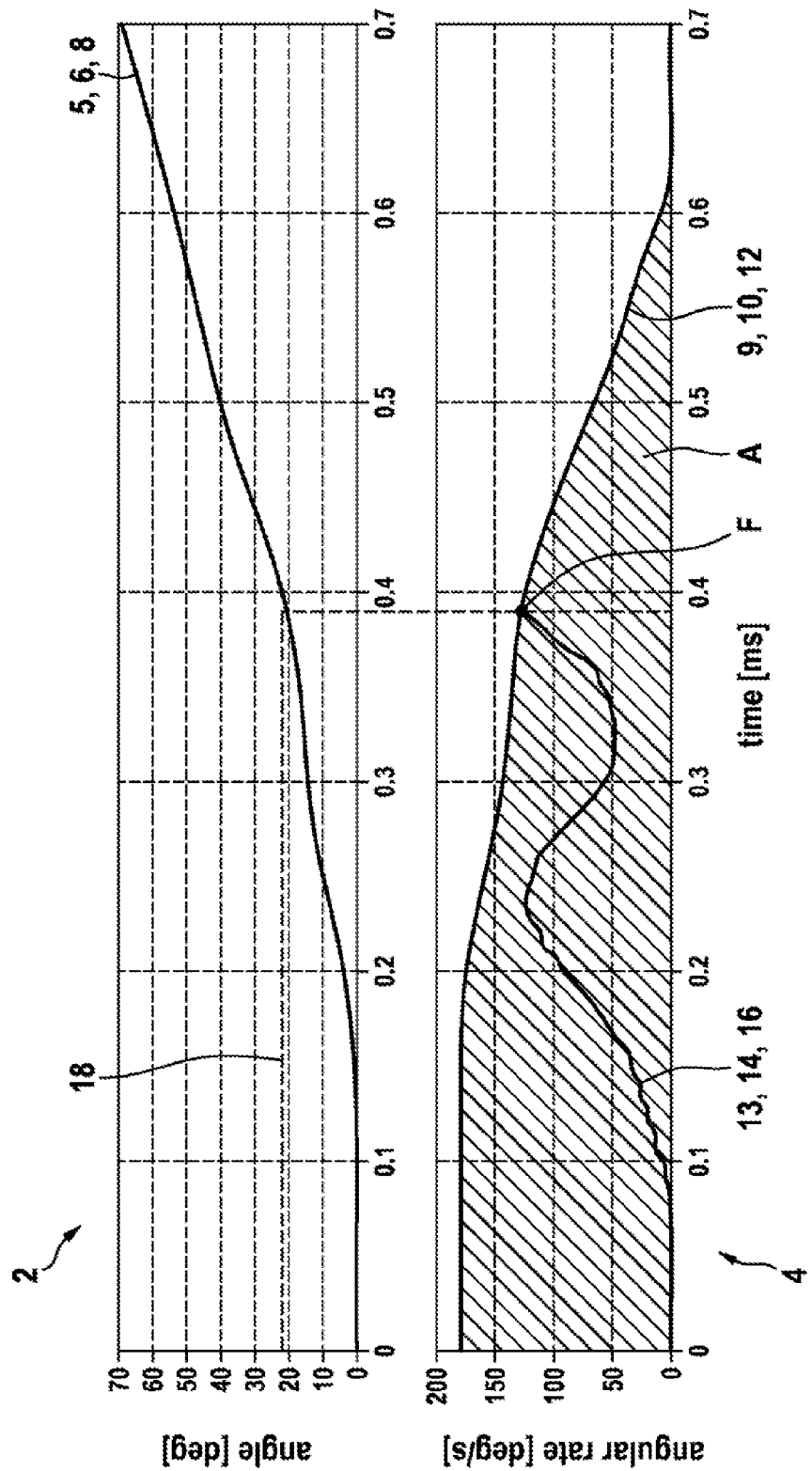
FIG. 1 shows two Cartesian coordinate systems which are situated one above the other, in which an angle, an ascertained rotational rate, and a critical rotational rate are plotted over a time axis.

FIG. 1 shows a first Cartesian coordinate system 2 and a second Cartesian coordinate system 4 which are situated one above the other. A period of time is plotted in milliseconds on the abscissa of both coordinate systems 2, 4. An ordinate of first Cartesian coordinate system 2 shows an angle in degrees, whereas a rotational rate in degrees per second is plotted on the ordinate of second Cartesian coordinate system 4. In first coordinate system 2, an angle 5 of a vehicle is depicted, which the vehicle, in particular a motorcycle or three-wheeler, may assume as an inclination angle 6 or a slope angle 8. In second coordinate system 4, a critical rotational rate 9 is depicted, which corresponds to angle 5 in that the larger angle 5 is, the lower is critical rotational rate 9. This means that the smaller angle 5 is, the higher is critical rotational rate 9 to which the vehicle may be subjected, until the vehicle topples. A critical roll rate 10 corresponds to inclination angle 6, and a critical pitch rate 12 corresponds to slope angle 8. Furthermore, an ascertained rotational rate 13 is depicted in second coordinate system 4, which may be formed as a roll rate 14 ascertained at inclination angle 6 or as a roll rate 16 ascertained at slope angle 8. As long as ascertained rotational rate 13 is situated within an area A which is delimited by critical rotational rate 9 and the abscissa and the ordinate of second coordinate system 4, the vehicle will in all probability not topple or overturn during the travel. However, if ascertained rotational rate 13 is equal to critical rotational rate 9, overturning of the vehicle and thus a fall of the rider sitting on the vehicle may be assumed. At this point in time, which is referred to here as trigger point F, the connecting element of the restraint device is released, so that the rider is no longer connected to the vehicle. In the present exemplary embodiment, trigger point F is reached at an angle of 22°. This is depicted here as dotted line 18.

Figure 2:
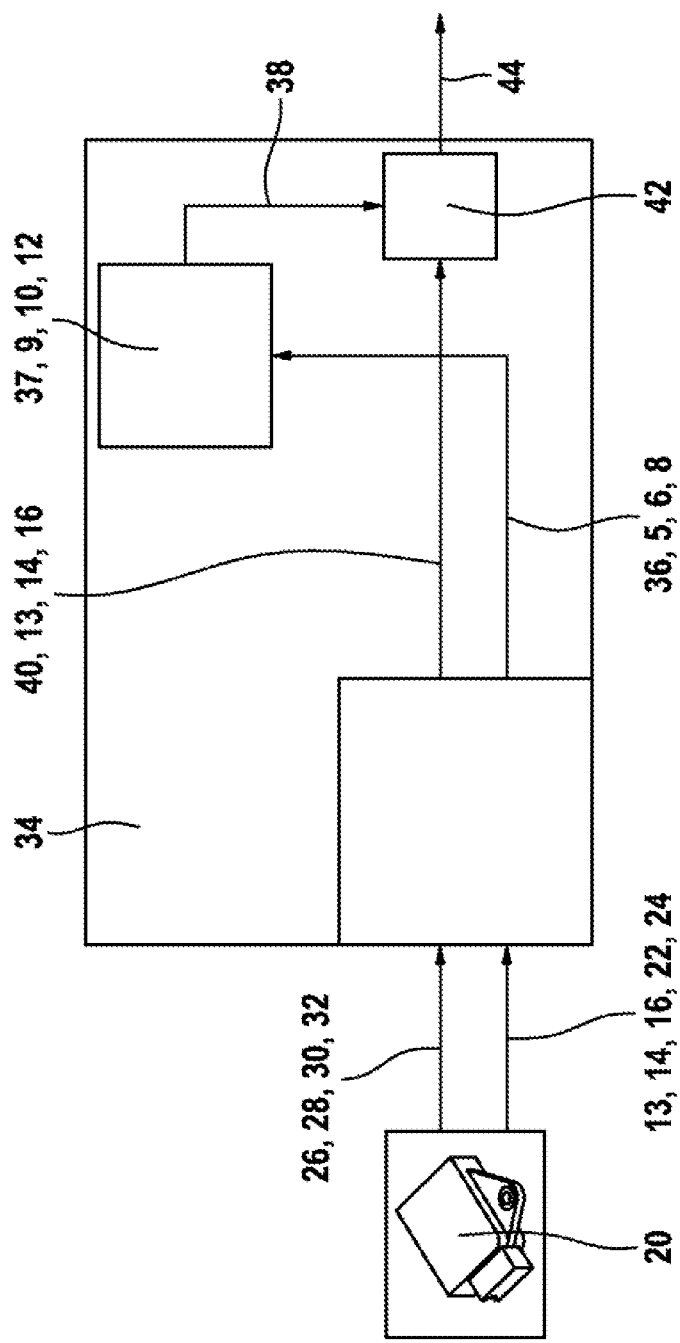
FIG. 2 shows a first control system for releasing a connecting element of a restraint device as a schematic diagram.

FIG. 2 shows a first control system for releasing the connecting element of the restraint device. Rotational rate 13, which takes the form of roll rate 14, pitch rate 16, or yaw rate 24, is transmitted to control unit 34 by an inertial sensor system 20. The transmission is depicted by a first arrow 22. This transmission may take place in a wired or wireless manner. Furthermore, a translational speed 28 in the longitudinal direction of the vehicle, a translational speed 30 in the transverse direction of the vehicle, and a translational speed 32 in the vertical direction of the vehicle are ascertained by inertial sensor system 20 and transmitted to control unit 34. This transmission is depicted as second arrow 26. Using these measured values, control unit 34 calculates an angle 5 as inclination angle 6 and/or slope angle 8. This angle 5 is transmitted along third arrow 36 to the characteristic curve memory 37, in which critical rotational rates 9 are stored as a critical roll rate 10 and/or a critical pitch rate 12. This critical rotational rate 9 is transmitted to a decision unit 42. In decision unit 42, critical rotational rate 9 is compared with ascertained rotational rate 13 as ascertained roll rate 14 and/or ascertained pitch rate 16, these values being transmitted along a fifth arrow 40 to decision unit 42. Sixth arrow 44 is used to indicate that in the present exemplary embodiment, ascertained rotational rate 13 is equal to corresponding critical rotational rate 9 or greater than corresponding critical rotational rate 9, and a signal has correspondingly been transmitted to the connecting element, on the basis of which the connecting element is released. Of course, control unit 34 may be designed in such a way that it is connected solely to inertial sensor system 20, and only the signal is transmitted to the connecting element.

Figure 3:
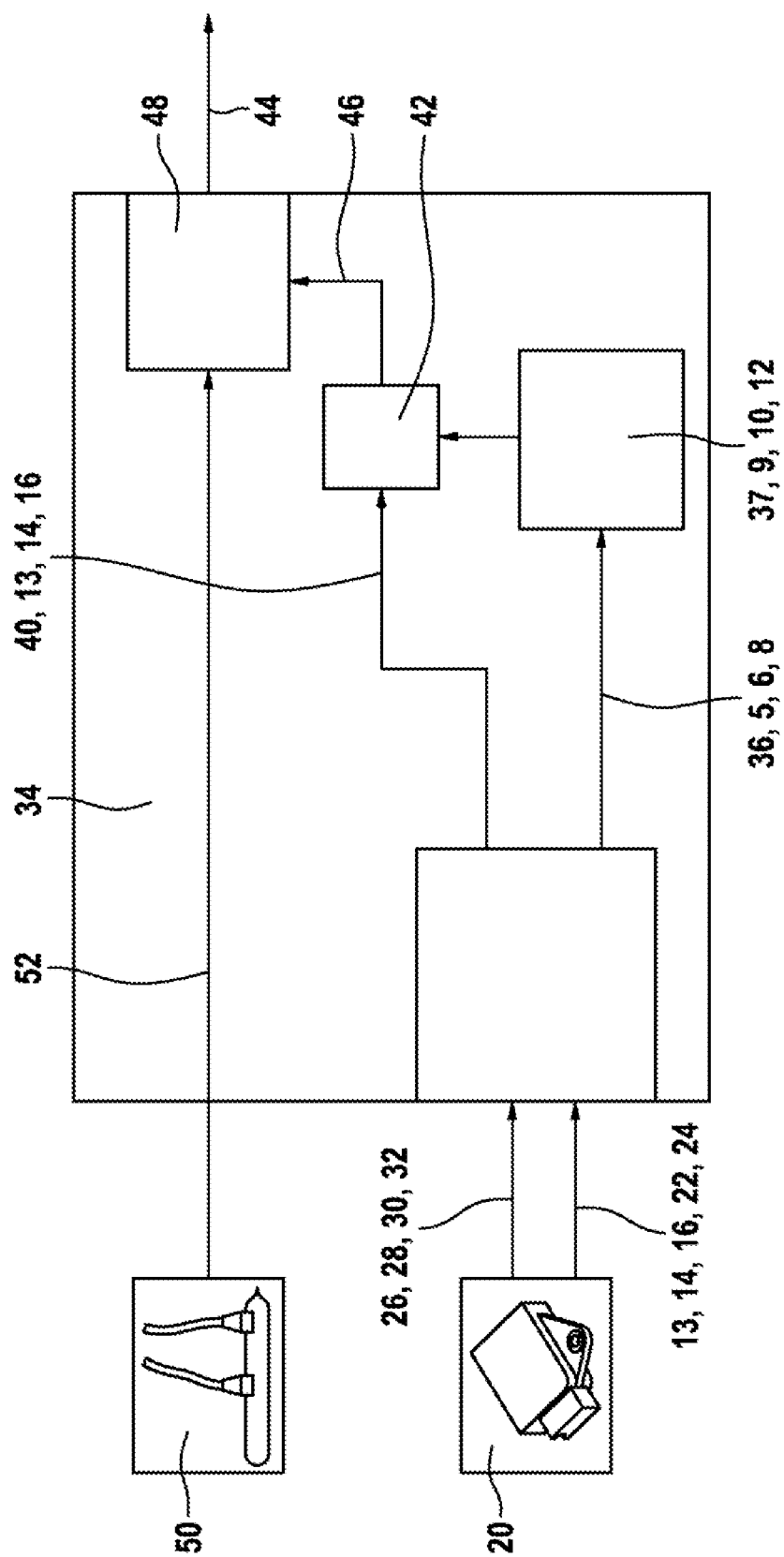
FIG. 3 shows a second control system for releasing a connecting element of the restraint device as a schematic diagram.

FIG. 3 differs from the depiction in FIG. 2 in that if a decision has been made in decision unit 42 to release the connecting element, this information is transmitted to a logic unit 48, this action being depicted by a seventh arrow 46. A second sensor 50 is connected to logic unit 48, second sensor 50 being designed as a mercury switch. The switching state is transmitted along an eighth arrow 52 to logic unit 48. If switch 50 is actuated, a decision is made by logic unit 48 to release the connecting element. This is indicated by sixth arrow 44, which is known from FIG. 2.

Figure 4:
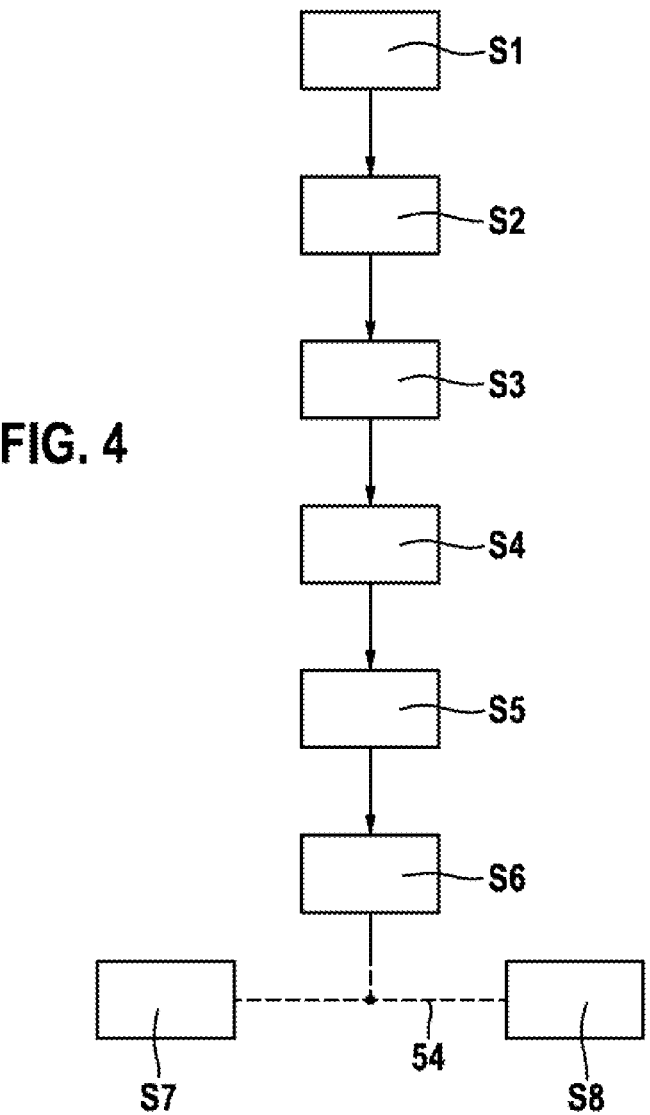
FIG. 4 shows a method for releasing the connecting element of the restraint device as a block diagram.
Figure 5:
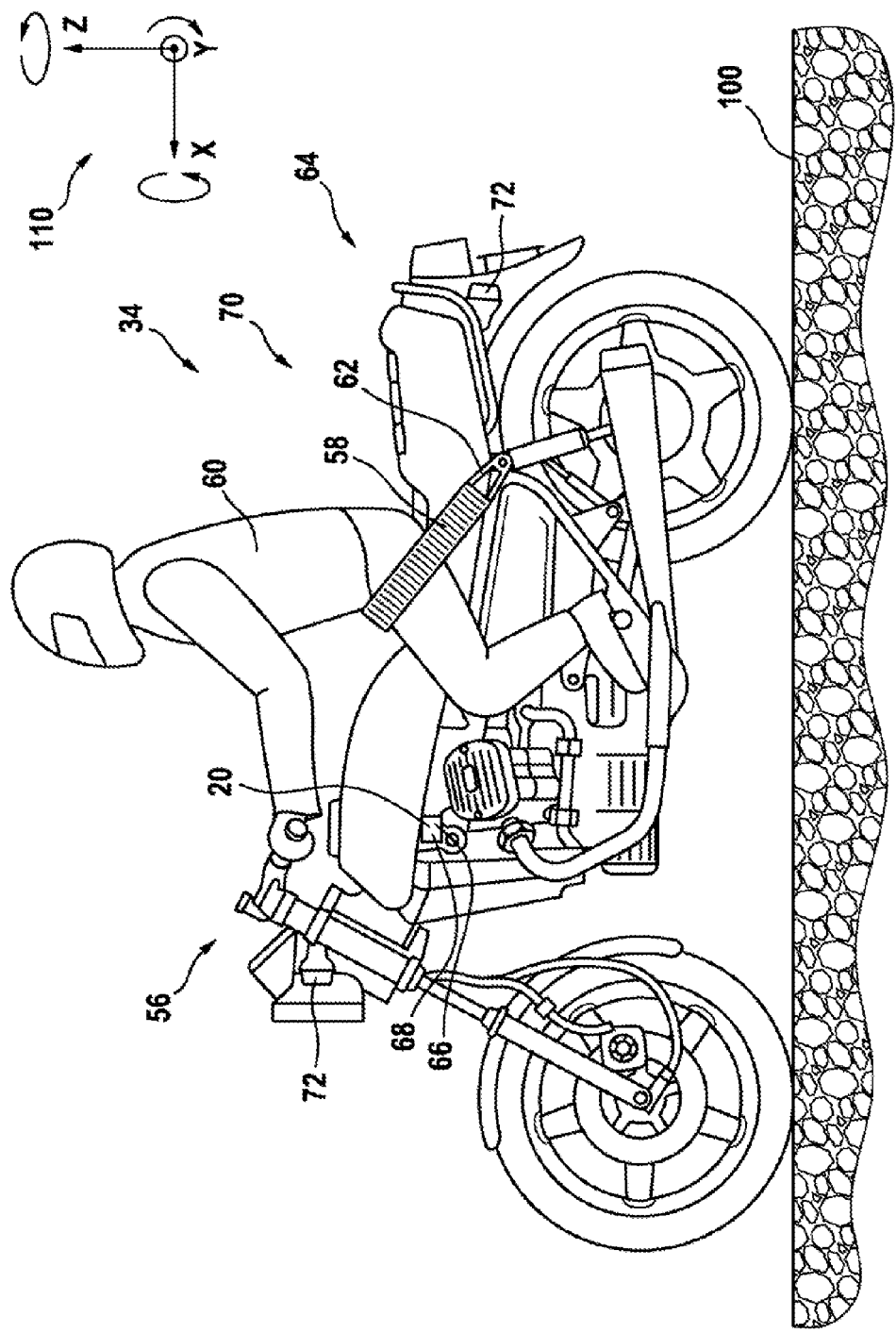
FIG. 5 shows a vehicle designed as a motorcycle, which is configured to carry out the method known from FIG. 4, in a side view.

FIG. 4 shows a method for releasing a restraint device for a rider on a vehicle, in particular, a two- or three-wheeler, the restraint device having a connecting element, and the rider and the vehicle being detachably connected by the connecting element. The method has a first method step S1, in which an inclination angle 6 and/or a slope angle 8 of the vehicle is ascertained. In a second method step S2, respectively one rotational rate 13, 14, 16 about a longitudinal axis of the vehicle and/or a transverse axis of the vehicle is ascertained. In a method step S3, each ascertained rotational rate 13, 14, 16 is compared with an associated critical rotational rate 9, 10, 12, which is a function of inclination angle 6 and/or inclination angle 8. In a method step S4, the connecting element is released if ascertained rotational rate 13, 14, 16 is equal to associated critical rotational rate 9, 10, 12 or greater than associated critical rotational rate 9, 10, 12. In a fifth method step S5, a translational speed is ascertained in a longitudinal axis of the vehicle and at a particular translational speed in a transverse axis of the vehicle and/or in a vertical direction of the vehicle. In a sixth method step S6, the ascertained rotational rate 13, 14, 16 is verified by the particular ascertained translational speed. Optionally, in a seventh method step S7, an emergency signal including a piece of information is transmitted if the ascertained rotational rate 13, 14, 16 is equal to the associated critical rotational rate 9, 10, 12 or greater than the associated critical rotational rate 9, 10, 12. The information may be a vehicle condition before a fall of a motorcycle rider or information about a location of the fall. The optionality is indicated by a dashed line 54. Furthermore, an eighth method step S8, which is also indicated by dashed line 54, may be carried out optionally and in parallel or alternatively to seventh method step S7. In eighth method step S8, at least one warning device which is situated on the vehicle and perceptible to other road users is switched on if ascertained rotational rate 13, 14, 16 is equal to critical rotational rate 9, 10, 12 or greater than critical rotational rate 9, 10, 12. 'X' indicates the longitudinal direction of the vehicle. A rotation about longitudinal direction of vehicle X is referred to as rolling. 'Y' indicates the transverse direction of the vehicle. A rotation about the transverse direction of vehicle Y is referred to as pitching. 'Z' indicates the vertical direction of the vehicle. A movement about the vertical direction of vehicle Z is referred to as yawing. Vehicle 56 has a restraint device 58 for a rider 60. Restraint device 58 has a connecting element 62, rider 60 and vehicle 56 being detachably connected to each other by connecting element 62. In the present exemplary embodiment, connecting element 62 is detachably secured to a rear frame element 64 of motorcycle 56. Control unit 34 which is situated on motorcycle 56 is designed having inertial sensor system 20 containing a first sensor 66 and a second sensor 68.

Furthermore, control unit 34 and connecting element 62 are connected to each other. Instantaneous rotational rates 13, 14, 16 are ascertained with the aid of first sensor 66, a separate first sensor 66 being able to be provided for ascertaining each rotational rate. A translational speed in longitudinal direction of vehicle X, in transverse direction of vehicle Y, and/or in vertical direction of vehicle Z is detected with the aid of second sensor 68, a separate second sensor 68 being able to be provided for ascertaining each translational speed. Inertial sensor system 20 may thus be made up of three first sensors 66 and three second sensors 68 for ascertaining all rotational rates and all translational speeds. First sensor 66 and second sensor 68 may each be designed as an inertial sensor. Furthermore, control unit 34 and a transmitting device 70 are connected to each other, transmitting device 70 being configured to transmit an emergency signal if ascertained rotational rate 13, 14, 16 and associated critical rotational rate 9, 10, 12 are equal. In addition, a warning device 72 is situated on vehicle 56, which is designed as hazard warning lights and is thus perceptible to other road users. Warning device 72 and control unit 34 are connected to each other, warning device 72 being switched on by control unit 34 if ascertained rotational rate 13, 14, 16 and critical rotational rate 9, 10, 12 are equal.

What is claimed is:

1. A method for releasing a restraint device for a rider on a vehicle, the restraint device having a connecting element, wherein the rider and the vehicle are detachably connected to each other by the connecting element, the method comprising:
    ascertaining a slope angle of the vehicle;
    ascertaining a rotational rate about a transverse axis of the vehicle;
    comparing the ascertained rotational rate with an associated critical rotational rate which is a function of the slope angle; and
    releasing the connecting element if the ascertained rotational rate is at least equal to the associated critical rotational rate.

2. A method for releasing a restraint device for a rider on a vehicle, the restraint device having a connecting element, wherein the rider and the vehicle are detachably connected to each other by the connecting element, the method comprising:
    ascertaining at least one of an inclination angle and a slope angle of the vehicle;
    ascertaining at least one of a rotational rate about a longitudinal axis of the vehicle and a rotational rate about a transverse axis of the vehicle;
    comparing the at least one ascertained rotational rate with an associated critical rotational rate which is a function of the at least one of the inclination angle and the slope angle;
    ascertaining (i) a translational speed in a longitudinal direction of the vehicle and (ii) a translational speed in at least one of a transverse direction of the vehicle and in a vertical direction of the vehicle;
    verifying the ascertained rotational rate by the ascertained translational speeds; and
    releasing the connecting element if the ascertained rotational rate is at least equal to the associated critical rotational rate.

3. The method as recited in claim 2, further comprising:
    transmitting an emergency signal including an item of information if one of (i) the ascertained rotational rate and the associated critical rotational rate are equal, or (ii) the ascertained rotational rate is greater than the associated critical rotational rate.

4. The method as recited in claim 3, wherein the item of information is one of a vehicle condition before a fall of the vehicle and a location of the fall of the vehicle.

5. The method as recited in claim 3, further comprising:
    switching on at least one warning device which is situated on the vehicle and is perceptible to other road users if one of (i) the ascertained rotational rate and the associated critical rotational rate are equal, or (ii) the ascertained rotational rate is greater than the associated critical rotational rate.

6. A vehicle, comprising:
    a restraint device for a rider, wherein the restraint device has a connecting element by which the rider and the vehicle are detachably connected to each other;
    a control unit; and
    a first sensor;
    wherein:
        the control unit and the first sensor are connected to each other;
        the control unit and the connecting element are connected to each other;
        the first sensor detects a measured value and transmits the measured value to the control unit;
        the control unit (i) ascertains a slope angle of the vehicle from the measured value, (ii) ascertains a rotational rate about a transverse axis from the measured value, and (iii) compares the ascertained rotational rate with an associated critical rotational rate which is a function of the slope angle; and
        the connecting element is controlled by the control unit in such a way that the connection of the rider to the vehicle by the connecting element is released if the ascertained rotational rate is at least equal to the associated critical rotational rate.

7. A vehicle, comprising:
    a restraint device for a rider, wherein the restraint device has a connecting element by which the rider and the vehicle are detachably connected to each other;
    a control unit;
    a first sensor;
    wherein:
        the control unit and the first sensor are connected to each other;
        the control unit and the connecting element are connected to each other;
        the first sensor detects a measured value and transmits the measured value to the control unit;
        the control unit (i) ascertains at least one of an inclination angle and a slope angle of the vehicle from the measured value, (ii) ascertains a rotational rate from the measured value, and (iii) compares the ascertained rotational rate with an associated critical rotational rate which is a function of the at least one of the inclination angle and the slope angle; and
    a second sensor;
    wherein:
        the control unit and the second sensor are connected to each other;
        the second sensor detects a measured value and transmits the measured value to the control unit;
        the control unit ascertains a translational speed in a longitudinal direction of the vehicle and a translational speed in at least one of a transverse direction of the vehicle and in a vertical direction of the vehicle from the measured value;
        the ascertained rotational rate is verified by the control unit using the ascertained translational speeds; and
        the connecting element is controlled by the control unit in such a way that the connection of the rider to the vehicle by the connecting element is released if the ascertained rotational rate is at least equal to the associated critical rotational rate.

8. The vehicle as recited in claim 7, wherein the first and second sensors are each an inertial sensor.

9. The vehicle as recited in claim 7, further comprising:
    a transmitting device connected to the control unit, wherein the transmitting device transmits an emergency signal if the ascertained rotational rate is at least equal to the associated critical rotational rate.

10. The vehicle as recited in claim 7, further comprising:
    a warning device which is situated on the vehicle and perceptible to other road users, wherein the warning device is connected to the control unit, and wherein the warning device is switched on by the control unit if the ascertained rotational rate is at least equal to the associated critical rotational rate.

* * * * *